(12) United States Patent
Nishigaki et al.

(10) Patent No.: US 6,590,678 B1
(45) Date of Patent: Jul. 8, 2003

(54) IMAGE PROCESSING APPARATUS CAPABLE OF PRECISE COLOR CORRECTION WITH REDUCED MEMORY CAPACITY

(75) Inventors: Junji Nishigaki, Toyokawa (JP);
Takayuki Nabeshima, Toyokawa (JP);
Kazuhiro Ishiguro, Toyokawa (JP);
Hideyuki Hashimoto, Toyokawa (JP);
Kenichi Morita, Toyohashi (JP);
Takashi Yamauchi, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/235,879

(22) Filed: Jan. 22, 1999

(30) Foreign Application Priority Data

Jan. 23, 1998 (JP) ............................................. 10-011413

(51) Int. Cl.[7] .................................................. H04N 1/46
(52) U.S. Cl. ..................... 358/501; 358/504; 358/518; 358/523; 358/525; 382/162; 382/167
(58) Field of Search ................................. 358/501, 504, 358/505, 518, 523, 525, 401; 382/162, 167

(56) References Cited

U.S. PATENT DOCUMENTS 5,436,739 A  7/1995  Imao et al. ................. 358/518

*Primary Examiner*—Edward Coles
*Assistant Examiner*—Tia A. Carter
(74) *Attorney, Agent, or Firm*—Sidley Austin Brown & Wood LLP

(57) ABSTRACT

The amount in offset of toner or the like is used to determine two points sandwiching lattice points of input data and divide the region between the two points equally in N−1. The output values at the two points and each point equally dividing the region are obtained to calculate gradients m1–m8 between any two adjacent ones of the points. Then, difference values dm1–dm7 in gradient between any two adjacent ones of the straight lines are calculated and (N−1) lattice points serving as dividing points are selected from the difference values in descending order. It should be noted that N is smaller than M. Then, the input and output values of the determined (N+1) lattice points N0–N4 are plotted and they are bounded by straight line and thus plotted to linearly interpolate the output data for the input data. Thus, an image processing apparatus can be provided capable of precisely modifying output images with reduced memory capacity.

15 Claims, 7 Drawing Sheets

$m1 = f(x0) - f(Lx)$     $dm1 = |m2 - m1|$
$m2 = f(x1) - f(x0)$     $dm2 = |m3 - m2|$
$m3 = f(x2) - f(x1)$     $dm3 = |m4 - m3|$
$m4 = f(x3) - f(x2)$     $dm4 = |m5 - m4|$
$m5 = f(x4) - f(x3)$     $dm5 = |m6 - m5|$
$m6 = f(x5) - f(x4)$     $dm6 = |m7 - m6|$
$m7 = f(x6) - f(x5)$     $dm7 = |m8 - m7|$
$m8 = f(Hx) - f(x6)$ ( |A| REPRESENTS THE ABSOLUTE VALUE OF A)

IMAGE PROCESSING APPARATUS CAPABLE OF PRECISE COLOR CORRECTION WITH REDUCED MEMORY CAPACITY

This application is based on application No. 10-011413 filed in Japan, the contents of which is hereby incorporated by reference.

BACKGROUND OF THE INVENTION

1. Field of the Invention

The present invention relates to image processing apparatuses and in particular to image processing apparatuses capable of appropriate color correction with reduced memory capacity.

2. Description of the Related Art

In the field of color printing and color copying, there have been known image processing apparatuses by which image data read in the RGB system are output as data in the CYMK system. In such an image processing apparatus, to reduce its memory capacity a lookup table having a reduced capacity and linear interpolation are used to divide each input signal by a predetermined interval and apply linear interpolation in the divided regions.

In conventional color corrections, colors are previously corrected considering the reproduction characteristics of the colors of the toner in the printing system to reproduce the colors faithfully. Such techniques include those based on linear and non-linear color-masking techniques, interpolation technique using a lookup table (referred to as a LUT hereinafter), and the like. According to interpolation technique using the LUT, the relation between an input value and an output value is free of any limitations and any non-linear curves can be represented so that errors due to color correction can be reduced. The size of the LUT can also be changed depending on the object and demand.

An interpolation technique using a LUT will now be described with reference to the block diagram shown in FIG. 9. There will be described here a system in which an input color space is assumed to be signals C0, M0, Y0 in a CMY color space converted from an RGB color space via various processes, such as tone conversion, UCR/BP, and its output color space after an interpolation process is assumed to be data C, M, Y considering the color reproductivity of the toner of the printing system. The system may of course be used for another single type of color-space conversion, such as that from an RGB color space to a YCrCb color space, that from an RGB color space to a CIEL*a*b* color space.

Referring to FIG. 9, a conventional color-correction block includes a storage table 301 receiving signals C0, M0, Y0 of the CMY color space, and an interpolator 302 using data output and input from and to storage table 301 to interpolate each data.

Storage table 301 is a three-dimensional LUT for storing a plurality of data C, M, Y to be output for input signals C0, M0, Y0, typically dividing each of the three orthogonal axes of the CMY color space into N regions at predetermined intervals to store $(N+1)^3$ even representative terms, wherein N represents an integer. In general N=8 is often applied, 729 even representative terms designated to form the LUT. The three-dimensional LUT stores a combination of <C0$i$, M0$i$, Y0$i$> and <Ci, Mi, Yi> of each lattice point, wherein $i$ represents an integer from 0 to N-1. It is determined to which equally divided region any signals C0, M0, Y0 input each belong, and the <C0$i$, M0$i$, Y0$i$> and <Ci, Mi, Yi> of a lattice point constituting the region are output to the subsequent stage or interpolator 302.

In interpolator 302, a unit cube with each lattice point as a vertex is constructed from lattice point data <C0$i$, M0$i$, Y0$i$> and <Ci, Mi, Yi> selected by input signals C0, M0, Y0 and output from storage table 301. Input signals C0, M0, Y0 are interpolated according to any of the interpolation methods described below, depending on the positional relation in the unit cube, to produce and output output signals C, M, Y:

(a) CUBE method: an interpolation method using eight vertices of a unit cube, the interpolation expression being an expression of eight terms of degree three.

(b) TETRA HEDRON method: an interpolation method which divides a unit cube into six tetrahedra having an equal volume around a diagonal axis to use four vertices thereof, the interpolation expression being an expression of four terms of degree one.

(c) PYRAMID method: an interpolation method which divides a unit cube into three pyramids having an equal volume around a diagonal axis of the unit cube to use five vertices thereof, the interpolation expression being an expression of five terms of degree three.

(d) PRISM method: an interpolation method which bisects a unit cube along a plane parallel to an axis (e.g. the C axis) to divide it into two triangular prisms to use six vertices thereof, the interpolation expression being an expression of six terms of degree two.

As described above, interpolation methods using a three-dimensional LUT are essentially based on the concept that a non-linear curve in a color space as a complex model can be divided into sufficiently small regions to establish a linear relation in the segment and allow approximation. For conventional color correction techniques, however, lattice point data <C0$i$, M0$i$, Y0$i$> and <Ci, Mi, Yi> stored in the three-dimensional LUT are configured of data each axis for which is divided equally in N, ignoring an original, non-linear curve provided by a relation between all input and output signals. Consequently, depending on the shape of a non-linear curve, e.g. a jagged curve with a plurality of inflection points, a linear relation is not established in a divided region and an approximation error between non-linearity and linearity will be increased disadvantageously.

FIG. 10 illustrates an example of such disadvantage. In this figure, linear interpolation of a three-dimensional color space is represented in one dimension (an expression of one variable) of C=f(x) for simplicity. Also for simplicity, N is equal to four and an input signal is equally divided into 0, 63, 127, 192, 255, and these values are represented along the x axis and the f(x) at each point is plotted along the x axis.

In this example, the non-linear curve obtained from all input values and output values obtained therefrom is shaped to have two inflection points, as shown in a narrow line a whereas the straight lines binding the output values at points 0, 63, 127, 192, 255 obtained by the equal division of the input signal are represented by a wide line b. Thus, particularly in such divided regions as those between 0 and 63, and between 127 and 192, the error between the non-linear curve (narrow line a) and the linearly approximate, straight line (wide line b) increases and a faithful result of interpolation cannot be obtained.

SUMMARY OF THE INVENTION

One object of the present invention is therefore to obtain appropriate output data corresponding to input data with less data than that of the input data when the input and output data are of non-linear.

Another object of the present invention is to provide an image processing method capable of using reduced memory capacity to precisely modify an output signal.

Still another object of the present invention is to provide an image processing apparatus capable of using reduced memory capacity to precisely modify an output signal.

The above objects of the present invention are achieved in accordance with the image processing method including the following elements. More specifically, in accordance with the present invention a data processing method outputting color data in non-linear relation with input data includes the steps of: forming M color images depending on M input data; reading the M formed color images to obtain M color data; picking up N sets of data including a set of input data and color data close to an inflection point, depending on a relation between the M input data and the M color data, wherein M>N; and performing operation based on the N sets of data to obtain output data corresponding to the input data.

Since N sets of data including a set of input data and color data close to an inflection point can be picked up from a relation between M input data and M color data, wherein M>N, and the N data can be used to obtain output data corresponding to the input data, the output data can be appropriately obtained corresponding to the input data using data less than the input data when the input data and the output data are non-linear.

In another aspect of the present invention, a data processing apparatus outputting color data in non-linear relation with input data includes: a color-image formation portion for forming M color images depending on M input data; a reception portion reading the M formed color images to obtain M color data; a picking-up portion for picking up N sets of data including a set of input data and color data close to an inflection point, depending on a relation between the M input data and the M color data, within M>N; and an operation portion for performing anoperation based on the N sets of data to obtain output data corresponding to the input data.

Since N sets of data including a set of input data and color data close to an inflection point can be picked up from a relation between M input data and M color data, wherein M>N, and the N data can be used to obtain output data corresponding to the input data, there can be provided a data processing apparatus capable of using reduced storage capacity to precisely modify an output signal.

Preferably, the picking-up portion includes: difference-value calculation portion for calculating a difference between each of M color data received and by the reception portion and each of two color data adjacent thereto and a select portion for selecting N difference values of a plurality of such obtained difference values in descending order.

The difference value between any adjacent two of M color data is calculated and N data are determined among such difference values in descending order. Thus data to be stored can readily be determined.

Preferably, the pick-up portion has previously stored input data and a targeted corrected value to pick up N color depending on a result obtained from input data and on the targeted corrected value.

The foregoing and other objects, features, aspects and advantages of the present invention will become more apparent from the following detailed description of the present invention when taken in conjunction with the accompanying drawings.

PREFERRED EMBODIMENTS OF THE INVENTION

Figure 1:
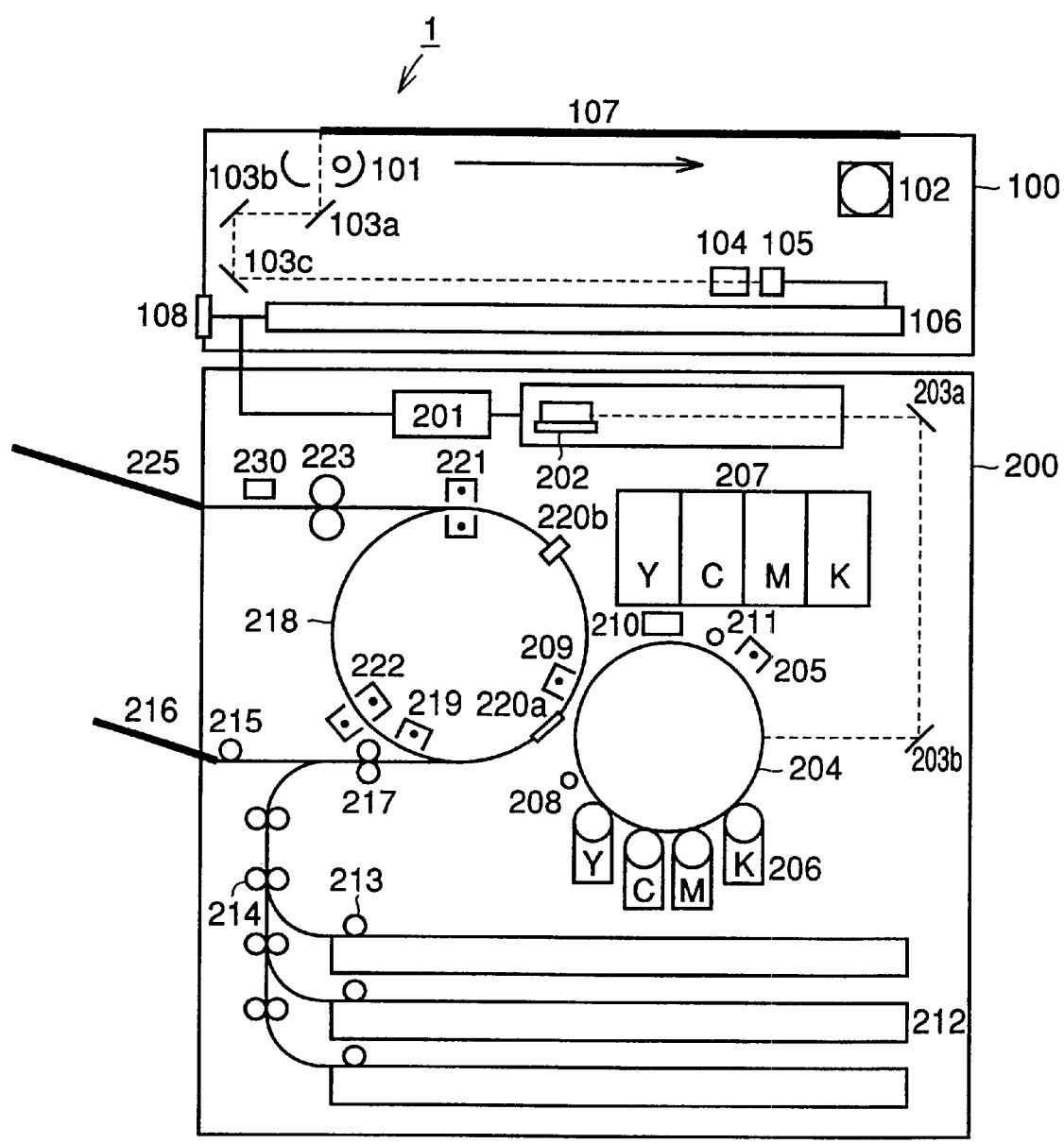
FIG. 1 is a schematic cross section of a general configuration of a digital full-color copier in accordance with the present invention.

The embodiment of the present invention will now be described with reference to the drawings. Referring to FIG. 1, a digital full-color copier 1 to which an image processing apparatus according to the present invention is applied includes an image reading unit 100 and a printer unit 200. Typically, image data read at image reading unit 100 is transmitted to printer unit 200 to form an image to achieve copying capability. Furthermore, interface 108 allows connection to external equipment so that image data read at image reading unit 100 can be output to the external equipment and image data from the external equipment can be sent to printer unit 200 to form an image.

In image reading unit 100, an exposure lamp 101 illuminates an original sheet on a platen glass 107. The light reflected from the original sheet is guided via a group of three mirrors 103a, 103b, 103c to a lens 104 and focused on a CCD sensor 105. A scanner motor 102 allows exposure lamp 101 and mirror 103a to scan in the direction of the arrow at a speed of V depending on the magnification to scan the entirety of a surface of the original sheet on platen glass 107. The scanning by exposure lamp 101 and mirror 103a is accompanied by the scanning by mirrors 103b and 103c in the same direction at a speed of V/2.

To light reflected from the original sheet that is incident on CCD sensor 105 is converted into an electrical signal in CCD sensor 105. Then an image processing circuit 106 and an image-data correction portion 201 applies analogue process, A/D conversion, and digital-image process to the electrical signal. The electrical signal thus processed is then sent to interface 108 or printer unit 200.

Printer unit 200 includes an exposure portion, an electro-photography portion, a fed-sheet transport portion, and a transfer and fixation portion. In printer unit 200, various elements are arranged including an exposure head 202, a photoreceptor 204, and a transfer drum 218 as the main elements. Focusing on them, the exposure portion will now be described.

Initially, image data sent from image reading unit 100 or interface 108 is subjected to correction process, such as color correction and γ correction, in image-data correction portion 201 and then sent to exposure head 202. Exposure head 202 responds to an electrical signal of the sent image data to cause laser to emit light which is in turn scanned by a polygon mirror in one dimension and thus transmitted via a pair of mirrors 203a, 203b to photoreceptor 204.

Around photoreceptor 204 are arranged various elements for performing electrophotography process. In the figure, photoreceptor 204 rotates clockwise to allow various processes to be performed successively. Initially, a transfer charger 205 charges photoreceptor 204. The charged photoreceptor 204 is exposed to laser light. Since the laser light emission is adapted to be more intense as the tone of image data is darker, the electrical charge on in photoreceptor 204 is removed. A portion from which electric charge is removed is developed by a developer portion 206 for each developing color. A toner holder 207 is provided to supply toner of various colors to developer portion 206. A tonered image formed on photoreceptor 204 has its unnecessary electrical charge removed by a pretransfer eraser 208 before the tonered image is transferred by a transfer charger 209 onto a sheet placed on a transfer belt. Then, photoreceptor 204 has unnecessary toner thereon removed by a cleaner 210 and then its electrical charge again removed by a main eraser 211 to be prepared for the next process.

In electrophotography process, the steps of charging, exposure, development, transfer and cleaning are performed as one routine and the routine process is repeatedly performed to form images. Particularly for forming full-color images, this process is repeated four times, one for each developing color, to form a full-color image.

The fed-sheet transport process will now be described. A sheet onto which an image is to be transferred is supplied onto the transfer belt in the order described below so that an image to be output is finally formed. Sheets of various sizes are set in a sheet-feeding cassette portion 212, and a sheet of the desired size is supplied to a transport path via a sheet-feeding roller 213 attached to each sheet-feeding cassette. The sheet supplied to the transport path is sent via a group of transport rollers 214 to a timing roller 217. If the desired sheet is not set in sheet-feeding cassette portion 212, the desired sheet can be set on a manual-feeder tray 216 and thus similarly sent to timing roller 217 via a sheet-feeding roller 215 for manual feeding.

The transfer and fixation portion will now be described. Transfer drum 218 is a cylinder on a surface of which a transfer film is stuck. Transfer drum 218 rotates counter-clockwise at the same speed as the rotation rate of the photoreceptor. In order to provide synchronization between a sheet holding position and the image transferring position, a reference plate 220a is mounted inside transfer drum 218. A reference signal indicative of a reference position of transfer drum 218 is generated when reference plate 220a passes across a reference-position sensor 220b. In synchronization with the reference signal, timing roller 217 can supply a sheet to the transfer belt to hold the sheet on the transfer belt at a predetermined position.

The sheet supplied from timing roller 217 to transfer drum 218 is attracted by an attraction charger 219 onto transfer drum 218 electrostatically. Then, transfer charger 209 allows a toner image to be held on the sheet while toner of each developing color is stacked on the sheet. When all of the tonered images are transferred onto the sheet, a pair of chargers for charge removal and sheet removal removes the electric charge of the electrostatically attracted sheet to separate the sheet from the transfer belt. Then, the transfer belt has its electric charge again removed by a pair of discharging chargers to prepare for the next sheet attraction. The tonered image on the sheet separated from transfer drum 218 is heated and melted by a pair of fixation rollers 223 before it is fixed on the sheet and then discharged onto a discharging tray 225.

Figure 2:
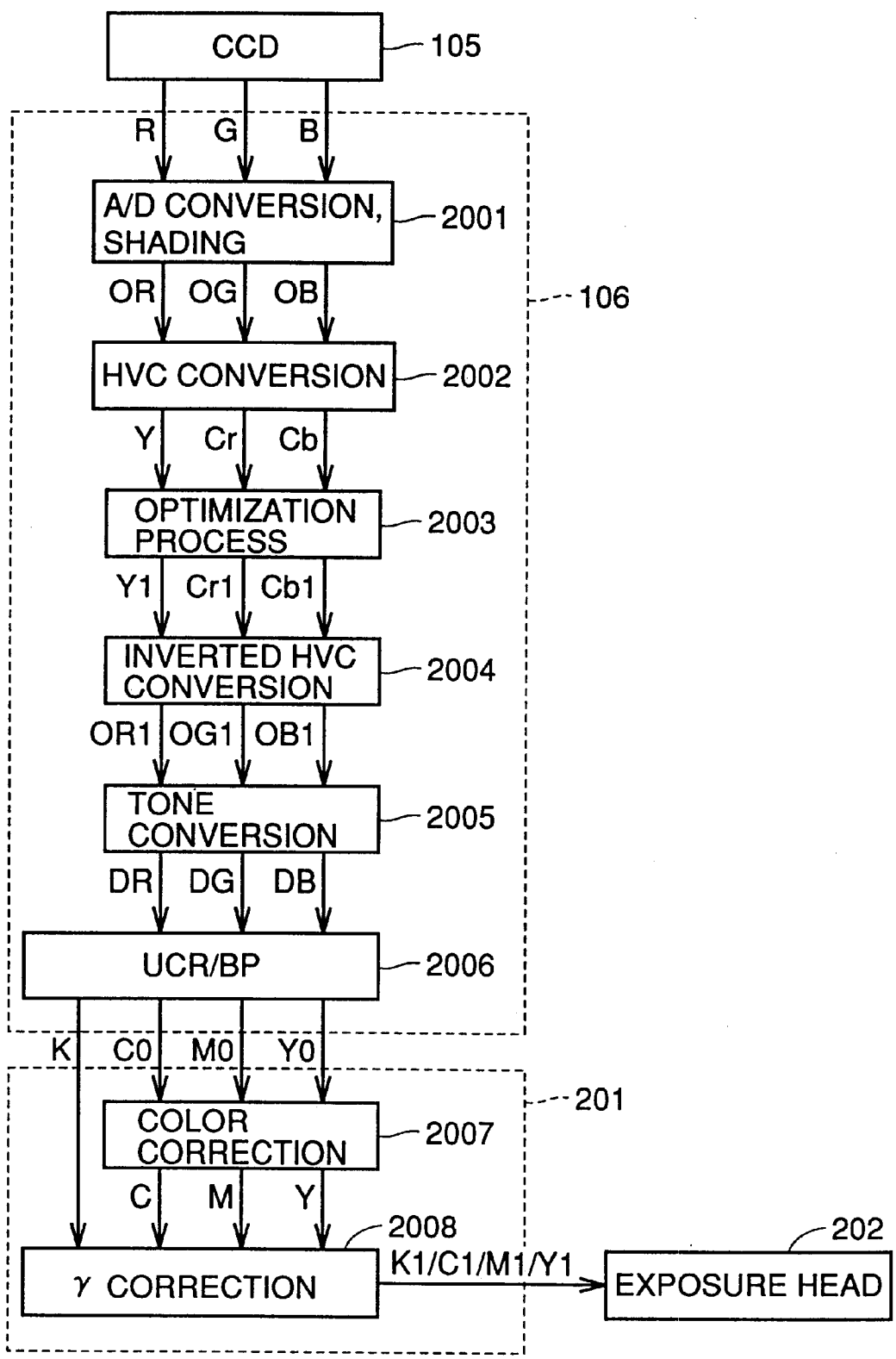
FIG. 2 is a block diagram showing a configuration of an image processing portion in accordance with the present invention.

FIG. 2 is a schematic block diagram of image processing circuit 106 and image correction portion 201, configuring an image processing portion, illustrating how image data read at CCD sensor 105 changes until it reaches the exposure portion of printer unit 200. Referring to FIG. 2, image processing circuit 106 includes an A/D conversion and shading portion 2001 receiving signals R,G,B from CCD sensor 105, a HVC conversion portion 2002, an optimization process portion 2003, an inverted HVC conversion portion 2004, a tone conversion portion 2005, and a UCR/BP portion 2006. Image data correction portion 201 includes a color correction portion 2007 and a $\gamma$ correction portion 2008. Image data processed in $\gamma$ correction portion 2008 is sent to the printer unit 200 exposure head 202.

An operation of the image processing portion will now be described. Initially, light incident on CCD sensor 105 is photoelectrically converted and thus output as electrical signals R, G, B to A/D conversion and shading portion 2001.

In A/D conversion and shading portion 2001, the input electrical signals R,G,B are converted from analogue to digital signals for each color. Furthermore, a shading characteristic at image reading unit 100 is also corrected to allow the digital signals to be converted into signals OR, OG, OB.

To readily process signals OR, OG, OB at a subsequent image process, HVC conversion circuit 2002 provides conversion into a YCrCb space, a type of color space based on human visual characteristics (hue: Hue, lightness: Value, Saturation: Chroma).

More specifically:

$$Y=F1Y(OR, OG, OB)$$

$$Cr=F1Cr(OR, OG, OB)$$

$$Cb=F1Cb(OR, OG, OB)$$

Conversion functions F1Y, F1Cr, F1Cb used herein convert input data OR, OG, OB into the YCrCb color representation system based on a conversion expression determined according to the NTSC standards, the high-vision standards, and the like.

Then, optimization process portion 2003 applies optimization process, such as AE, to data Y, Cr, Cb to convert the data into data Y1, Cr1, Cb1.

More specifically:

$$Y1=F2Y(Y)$$

$$Cr1=F2Cr(Y, Cr)$$

$$Cb2=F2Cb(Y, Cb)$$

Conversion functions F2Y, F2Cr, F2Cb used herein linearly convert input data Y, Cr, Cb.

Then, inverted HVC conversion process portion 2004 converts converted data Y1, Cr1, Cb1 into the data corresponding to the original data OR, OG, OB. It should be noted, however, that the data are not completely restored, since the data have been converted in the process at a previous stage. Thus, the data will be denoted as OR1, OG1, OB1.

$$OR1=F3R(Y1, Cr1, Cb1)$$

$$OG1=F3G(Y1, Cr1, Cb1)$$

$$OB1=F3B(Y1, Cr1, Cb1)$$

Conversion functions F3R, F3G, F3B used herein linearly are the inverse functions of F1R, F1G, F1B.

Then, tone conversion portion 2005 performs tone conversion to convert reflection data OR1, OG1, OB1 into tone data DR, DG, DB.

$$DR=F4R(OR1)$$

$$DG=F4G(OG1)$$

$$DB=F4B(OB1)$$

Conversion functions F4R,F4G,F4B used herein are log functions.

Then, UCR/BP portion 2006 applies UCR (under-color removal) and BP (black printing) to tone data DR, DG, DB for conversion into K, C0, M0, Y0 suitable for color data K (black), C (cyan), M (magenta), Y (Yellow) corresponding to toner coloring materials of the full-color copier.

$$K=F5K(DR, DG, DB)$$

$$C0=F5C(DR, DG, DB)$$

$$M0=F5M(DR, DG, DB)$$

$$Y0=F5Y(DR, DG, DB)$$

Conversion function F5K herein is used to obtain a value of a minimum value among DR, DG, DB multiplied by a coefficient. Functions F5C, F5M, F5Y are respectively used to obtain values of DR, DG, DB minus a minimum value of DR, DG, DB multiplied by a coefficient.

Then, color correction portion 2007 adjusts and thus converts C0, M0, Y0 into C, M, Y, considering the reproduction characteristics of the toner used for printing in the printer.

$$C=F6C(C0)$$

$$M=F6M(M0)$$

$$Y=F6Y(Y0)$$

F6C, F6M, F6Y are functions which has no limitation in the relation between input and output, capable of representing any complex, non-linear curves. The functions, based on a table interpolation method capable of miniaturization of color-correction errors, have a three-dimensional look-up table configured of the data of reduced capacity described hereinafter. Depending on a plurality of data stored in the look-up table, color data C0, M0, Y0 are linearly interpolated and thus approximated to produce C, M, Y.

At the last stage, γ correction portion 2008 applies γ correction to linearly reproduce a printing tone for data C, M, Y, K before K1, C1, M1, Y1 are transmitted to the exposure portion of the printer and thus printed.

$$C1=F6C(C)$$

$$M1=F6M(M)$$

$$Y1=F6Y(Y)$$

$$K1=F6K(K)$$

Conversion functions F6C, F6M, F6Y, F6K used herein are used as a table for correcting a tone curve experimentally obtained.

Figure 3:
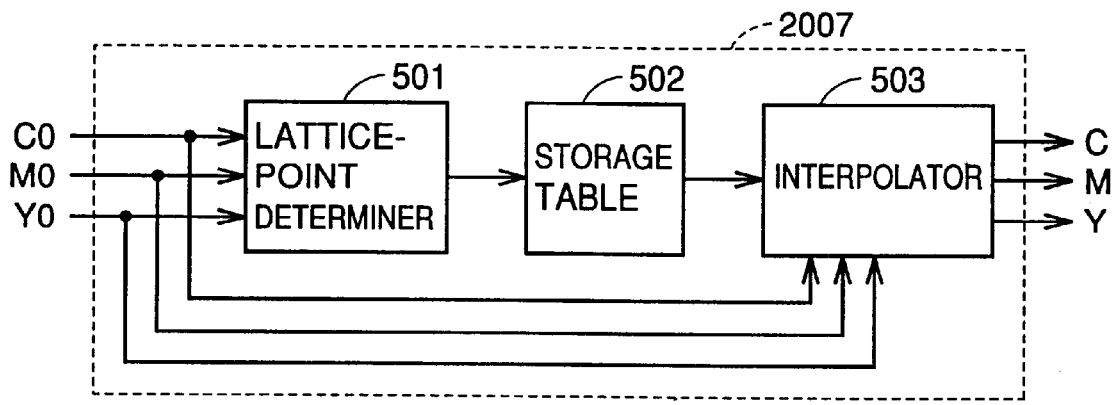
FIG. 3 is a block diagram showing a configuration of a color correction portion in accordance with the present invention.

FIG. 3 is a block diagram showing a configuration of the FIG. 2 color correction portion 2007. Referring to FIG. 3, color correction portion 2007 includes a lattice point determiner 501 receiving C0, M0, Y0, a storage table 502, and an interpolator 503. A conventional color correction portion divides each axis of the three orthogonal positions of a color space equally in N to determine lattice points <C0$i$, M0$i$, Y0$i$> and <Ci, Xh, Yi> to be stored in a storage table (i.e. a three-dimensional LUT configured of (N+1)$^3$ data), wherein i is an integer in a range of 0 to N−1. In contrast, color correction portion 2007 of the present embodiment is provided with a lattice point determiner 501 which reduces an error between a non-linear curve originally provided by all input signals and the output signals, and a straight line used for linear interpolation between lattice points. Lattice point determiner 501 uses previously stored M input signals <C0$j$, M0$j$, Y0$j$> (wherein M is an integer and larger than N+1, which represents the number of the input signals previously stored, and j is an integer in a range from 0 to N−1) and a targeted corrected value e.g. of <L*0, a*0, b*0> represented in a CIEL*a*b* color space to calculate output signals <Cj, Mj, Yj> for the input signals to determine the regions to be divided and output lattice point data <C0$i$, M0$i$, Y0$i$> and <Ci, Mi, Yi> to be stored to the storage table 502. Thus, color correction portion 2007 is adapted to store a targeted corrected value for an input signal according to a predetermined system. The details thereof will now be described with reference to FIGS. 4–8. It should be noted that storage table 502 and interpolator 503 will not be described since they are similar to those shown in FIGS. 8A–8C.

Figure 4:
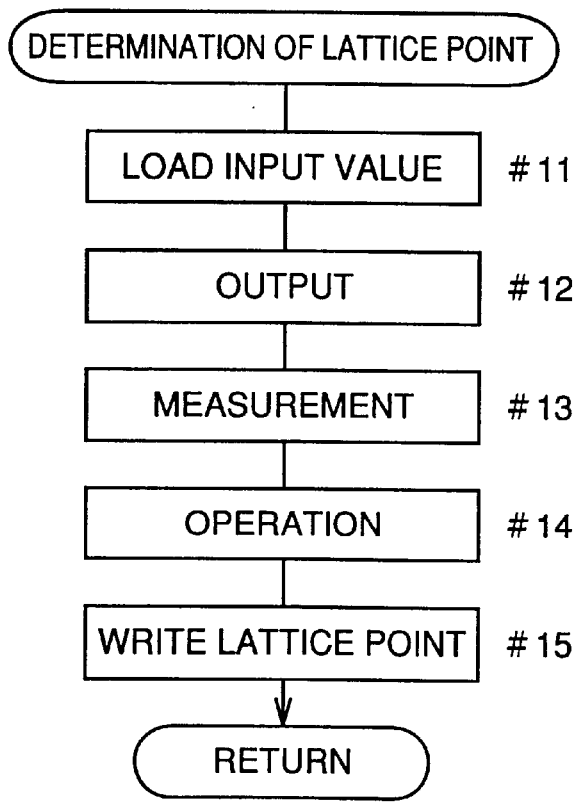
FIG. 4 is a flow chart of an operation of a lattice point determiner.
Figure 5:
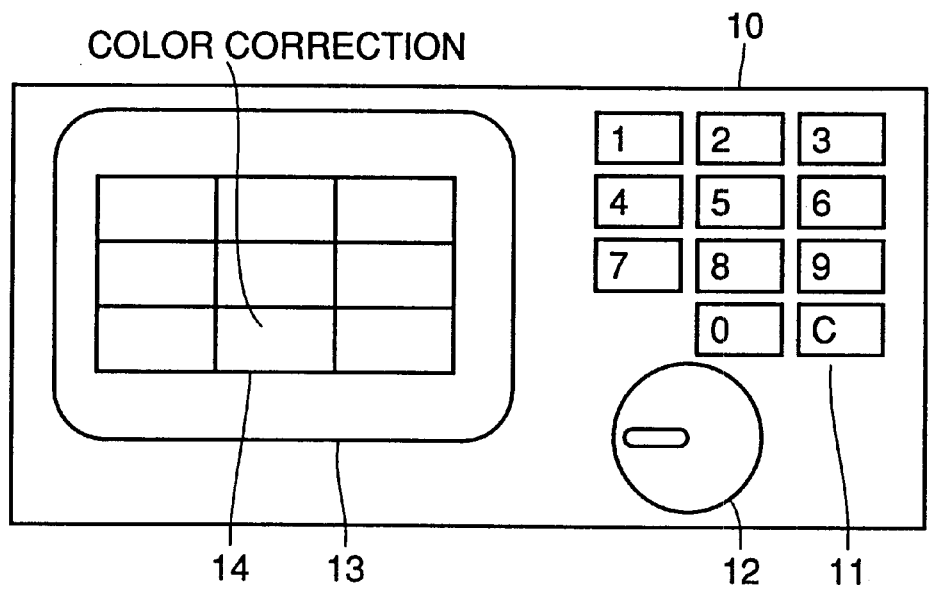
FIG. 5 is a plan view of an operation panel of a digital full-color copier.

The operation to determine a lattice point in lattice point determiner 501 will now be described with reference to the FIG. 4 flow chart. In the present embodiment, a color correction switch on an operation panel such as the one shown in FIG. 5 is used so that service personnel or the like can modify a color correction table together with other adjustments during regular maintenance of the color copier. This method may of course be adapted so that the body of the color copier automatically provides the modification without any input from service personnel or the like.

FIG. 5 is a schematic diagram showing an operation panel 10 of a digital full-color copier 1. Referring to FIG. 5, operation panel 10 includes numeral keys 11 and a copy start key 12 as well as a touch panel 13 formed of liquid crystal and provided with a color correction switch 14. When color correction switch 14 is pressed, M input signals <C0$j$, M0$j$, Y0$j$> previously stored are loaded at step #11 in the FIG. 4 flow chart, wherein M is an integer and larger than N, and j is an integer ranging from 0 to M−1.

Figure 6:
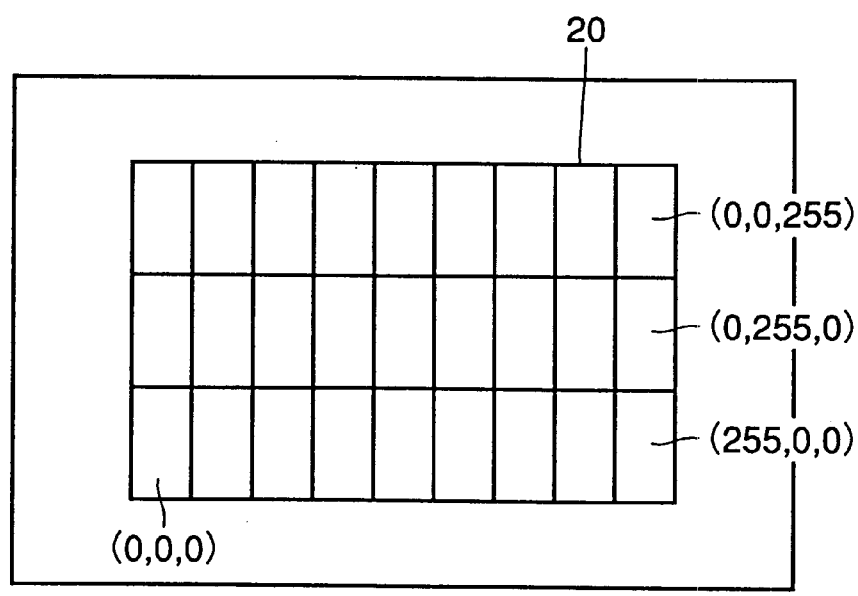
FIG. 6 is a conceptual view of a sample chart.

Then, a sample chart 20 configured by a plurality of color patches generated from input signals <C0$j$, M0$j$, Y0$j$> is printed out (#12). An exemplary sample chart is shown in FIG. 6. Sample chart 20 outputs data corresponding to (R, G, B).

The sample chart 20 obtained is measured using a reading device (CCD) of the body of full-color copier 1, a color measuring instrument or the like. Then, the result of measurement, and targeted corrected value <L*0, a*0, b*0> represented in the CIEL*a*b* color space corresponding to input signals <C0$j$, M0$j$, Y0$j$> previously stored are used to calculate output signal <Cj, Mj, Yj> to be targeted (#13).

In the present embodiment, the sample chart is output in the form of paper. However, in place of printing out it in the form of paper, a plurality of sensors may be used to directly measure a latent toner image on the photoreceptor to calculate signal <Cj, Mj, Yj> to be output.

Then, N lattice points to be stored are determined, wherein N is an integer representing the number of lattice points that can be stored in the storage table, by using the obtained, N input signals <C0$j$, M0$j$, Y0$j$> and output signals <Cj, Mj, Yj> to perform the operational process described below (#14):

(1) determine two points between which lattice points are placed. The two points are determined by obtaining the offset amount of toner in the sample chart 20 printed out;

(2) calculate the difference value between the respective gradients provided by input signal <C0$j$, M0$j$, Y0$j$> of interest and two input signals <C0$j$−1, M0−1, Y0$j$−1> and <C0$j$+1, M0$j$+1, Y0$j$+1> adjacent to thereto; and (3) among a plurality of such difference values calculated, select (N−1) difference values in descending order to render input signal <C0$j$, M0$j$, Y0$j$> of interest and the output signal <Cj, Mj, Yj> a lattice point.

The details of the above operational process will now be described with reference to FIGS. 7A and 7B and 8A–8C. For simplicity, the number N of lattice points that can be stored in the storage table is five and the number M of previously stored input values is no less than eight, wherein N represents an integer and M is an integer and larger than N.

Figures 7A, 7B:
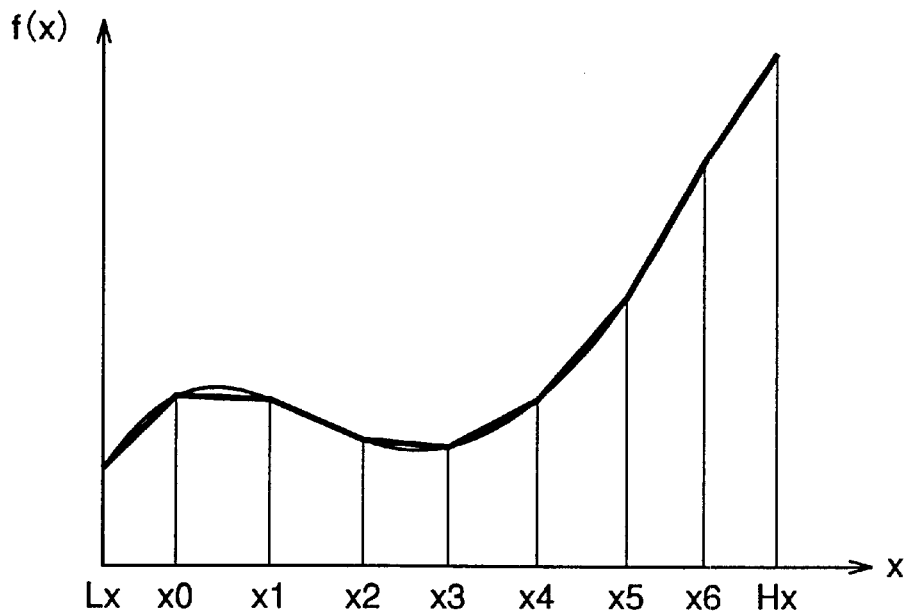
FIGS. 7A and 7B represent a content of a linear interpolation process.

As represented in FIG. 7A, the amount in offset of toner or the like is used to determine two points (in the figure, "Lx", "Hx") which serve as the points between which lattice points are placed. Then input values in the region between the two points (in the figure, seven values "x0", "x1", "x2", "x3", "x4", "x5", "x6" are shown for convenience) and a signal f(x) to be output therefrom are also represented. In the figure, the narrow line represents an ideal, non-linear curve representing all input signals and the wide line is formed by the straight lines obtained by binding the output values obtained from the sampled input values "x0", "x1", "x2", "x3", "x4", "x5", "x6".

Then, the expressions provided in FIG. 7B are used to calculate the gradient between any two adjacent points (in the figure, "m0", "m1", "m2", "m3", "m4""m5", "m6", "m7", "m8") and the difference value between the respective gradients of any two adjacent straight lines (in the figure, "dm1", "dm2", "dm3", "dm4", "dm5", "dm6", "dm7").

Figure 8A:
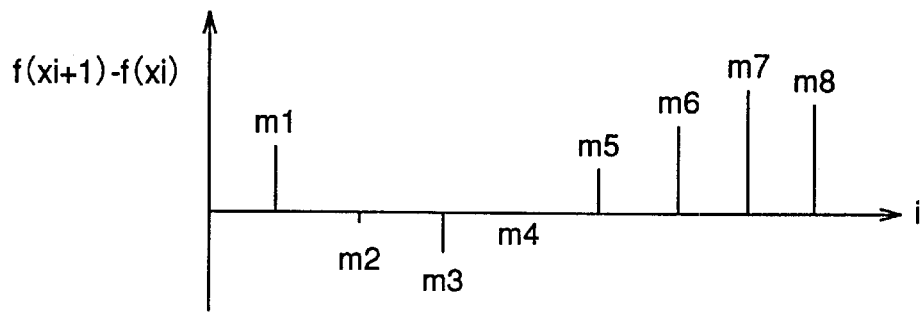
FIGS. 8A–8C represent a content of a linear interpolation process.
Figure 8B:
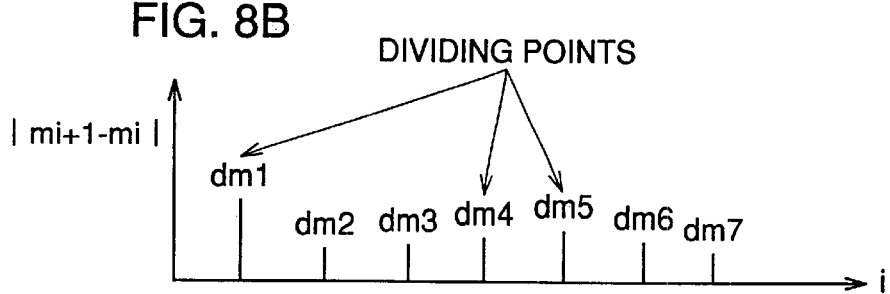

FIGS. 8A and 8B are a graph of gradient versus input value and a graph of difference value in gradient versus input value. Since the two points sandwiching lattice points have already been determined, among difference values in gradient between any two straight lines adjacent to an input values of interest (in the figure, "dm1", "dm2", "dm3", "dm4", "dm5", "dm6", "dm7", "dm8") (N−1) or three of them are selected in descending order to determine them as lattice points. Specifically, "dm1", "dm4", "dm5" in FIG. 8A are determined as lattice points and hence dividing points.

Figure 8C:
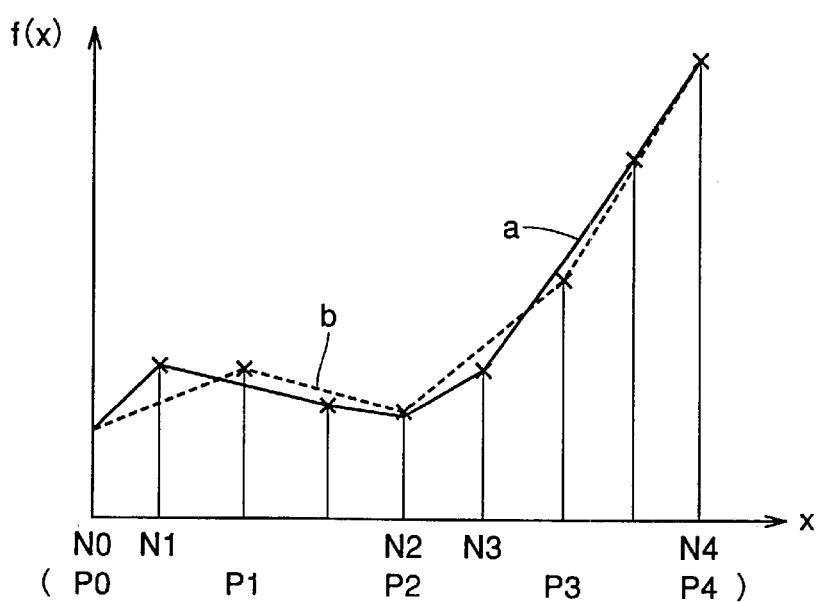
Figure 9:
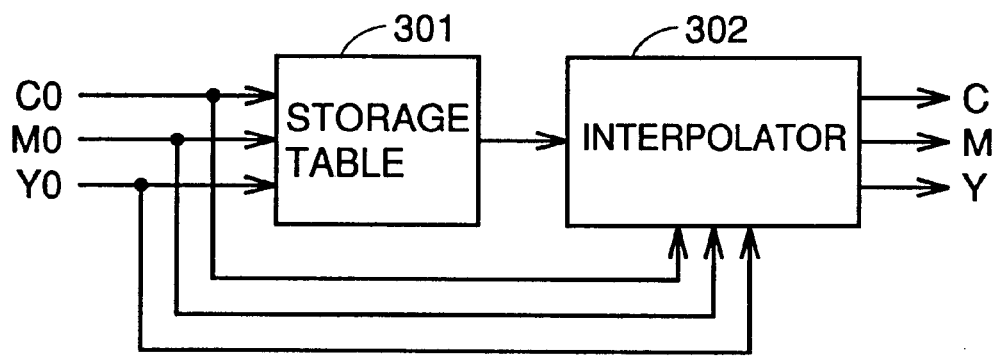
FIG. 9 is a block diagram showing a configuration of a conventional color correction portion.
Figure 10:
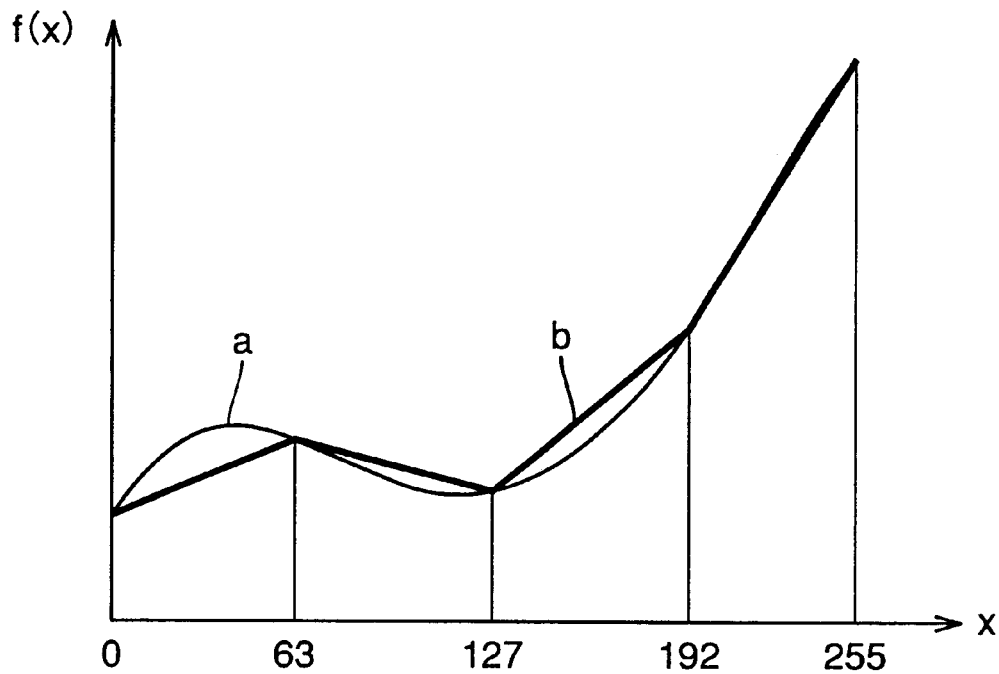
FIG. 10 represents a conventional linear interpolation in one dimension.

In FIG. 8C, the input and output values of the (N+1) lattice points determined by the above process (in the figure, "N0", "N1", "N2", "N3", "N4") are plotted and bounded by straight line (line a). For comparison, in FIG. 8C, input and output values of lattice points obtained according to a conventional equal-division method (in the figure, "P0", "P1", "P2", "P3", "P4") are plotted and bounded by broken line b.

The input signal <C0$j$, M0$j$, Y0$j$> and output signal <Cj, Mj, Yj> at each of (N−1) lattice points determined according to the above operation are written at a determined address of a storage table constituted by a three-dimensional LUT (#15).

Referring to FIGS. 8A and 8B, when each axis is conventionally, equally divided to determine lattice points, the ideal, original shape of a complex, non-linear curve, e.g. a jagged curve with a plurality of inflection points, is ignored and an error between a non-linear curve and a straight line approximate thereto increases in a divided, regional segment (e.g. "P0"–"P1" and "P2"–"P3" segments in FIG. 8B). In accordance with the present invention, the ideal, non-linearly curve provided by all of input signals and the output signals obtained therefrom can be formed by approximate, straight lines which reduce errors in the divided regions between lattice points. This allows reduction of errors between the non-linear curves and the straight lines approximate thereto in the divided regions.

Description will now be provided with respect to the body of a color copier which provides automatic modification without any input from servicing personnel or the like. In this case, in FIG. 1, the digital full-color copier is provided with a sensor 230 downstream of the pair of fixation rollers 223.

Sensor 230 reads an output result of the sample chart to provide automatic modification. It should be noted that this operation need only be set to be performed at a specific occasion (e.g. in regular maintenance).

In the above embodiment, input data (C0, M0, Y0) is adjusted to obtain color data (C, M, Y). However, the present invention is not limited thereto and can be applied when input data and output data corresponding thereto has a non-linear relationship. For example, the present invention can be applied to the conversion from RGB to CMYK. Furthermore, the dimensions of input and output data is not limited to three dimensions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing method of outputting color data in non-linear relation with input data, comprising the steps of:

forming M color images from M sets of input data;

reading the formed, M color images to obtain M sets of color data;

picking up N sets of data including one of the M sets of input data and one of the M sets of color data both close to an inflection point, based on a relation between the M sets of input data and the M sets of color data, wherein M>N; and performing an operation based on the N sets of data to obtain output data for the input data.

2. A data processing method according to claim 1, wherein said M sets of input data include three variables.

3. A data processing method according to claim 2, wherein said three variables are C (cyan), M (magenta), and Y (Yellow).

4. A data processing method according to claim 1, wherein said M sets of color data includes three variables.

5. A data processing method according to claim 4, wherein said three variables are C (cyan), M (magenta), and Y (Yellow).

6. A data processing method according to claim 1, wherein said step of picking up includes obtaining a difference between respective differences between a set of color data for any two adjacent ones of said M sets of input data to pick up the N sets of data including one of the M sets of input data and one of the M sets of color data close to said inflection point.

7. A data processing apparatus for outputting color data in non-linear relation with input data, comprising:

color-image formation means for forming M color images based on M sets of input data;

reception means for reading the formed, M color images to obtain M sets of color data;

means for picking up, depending on a relation between the M sets of input data and the M sets of color data, N sets of data including one of the M sets of input data and one of the M sets of color data close to an inflection point, wherein M>N; and operation means for performing an operation based on the N sets of data to obtain output data for the input data.

8. A data processing apparatus according to claim 7, wherein said means for picking up includes difference-value calculation means for calculating respective differences between any two adjacent ones of the M sets of color data received by said reception means, and further comprising select means for selecting N ones of plurality of the calculated differences in descending order.

9. A data processing apparatus according to claim 7, wherein said means for picking up has previously stored the set of input data and a targeted corrected value and, depending on a result obtained from a calculation based on the set of input data and the targeted corrected value, picks up N color data.

10. A data processing apparatus for outputting color data in non-linear relation with input data, comprising:

color-image formation means for forming M color images depending on M sets of input data;

means for reading the formed, M color images to obtain M sets of color data;

means for picking up, depending on a relation between the M sets of input data and the M sets of color data, N sets of data including one of the M sets of input data and one of the M sets of color data close to an inflection point, wherein M>N; and operation means for performing an operation based on the N sets of data to obtain output data for the input data.

11. A data processing apparatus according to claim 10, wherein said means for picking up includes difference-value calculation means for calculating respective differences between any two adjacent ones of the M sets of color data received by said reception means, and further comprising select means for selecting N ones of a plurality of the calculated differences in descending order.

12. A data processing apparatus according to claim 10, wherein said means for picking up has previously stored the set of input data and a targeted corrected value and, depending on a result obtained from a calculation based on the set of input data and the targeted corrected value, picks up the N color data.

13. A data processing apparatus according to claim 10, used for color correction of output data for input data, employing a three-dimensional look up table.

14. A data processing apparatus according to claim 13, wherein said look up table for color correction is updated regularly.

15. A data processing apparatus according to claim 14, further comprising a sensor for detecting output data for said input data, wherein said look up table is automatically updated depending on a result of detection provided via said sensor.

* * * * *